United States Patent
Heinemann et al.

(10) Patent No.: US 10,081,404 B2
(45) Date of Patent: Sep. 25, 2018

(54) HOLDER

(71) Applicant: ABUS August Bremicker Söhne KG, Wetter-Volmarstein (DE)

(72) Inventors: Stefan Heinemann, Wetter (DE); Matthias Ocklenburg, Darmstadt (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 170 days.

(21) Appl. No.: 15/186,806

(22) Filed: Jun. 20, 2016

(65) Prior Publication Data

US 2016/0368552 A1 Dec. 22, 2016

(30) Foreign Application Priority Data

Jun. 22, 2015 (DE) .................. 10 2015 109 997

(51) Int. Cl.
| | | |
|---|---|---|
| *B62J 11/00* | (2006.01) | |
| *B62H 5/00* | (2006.01) | |
| *E05B 37/02* | (2006.01) | |
| *E05B 67/38* | (2006.01) | |
| *E05B 67/00* | (2006.01) | |
| *E05B 71/00* | (2006.01) | |

(52) U.S. Cl.
CPC ............. *B62H 5/00* (2013.01); *E05B 37/025* (2013.01); *B62H 2005/008* (2013.01); *E05B 67/003* (2013.01); *E05B 71/00* (2013.01); *E05B 2067/386* (2013.01)

(58) Field of Classification Search
CPC .................................. B62J 11/00; E05B 67/06
USPC ............................................ 224/428, 442, 448
See application file for complete search history.

(56) References Cited

U.S. PATENT DOCUMENTS

| | | | | |
|---|---|---|---|---|
| 2,471,825 A | * | 5/1949 | Long ................... | B26B 19/3806 174/135 |
| 3,967,475 A | * | 7/1976 | Zane ....................... | B62H 5/00 224/425 |
| 4,126,024 A | * | 11/1978 | Timmons ............... | B62H 5/003 242/379.2 |
| 4,696,447 A | * | 9/1987 | Strecker ................ | A45D 20/12 248/206.3 |
| 5,007,566 A | * | 4/1991 | Fick ....................... | B62J 11/00 224/414 |

(Continued)

FOREIGN PATENT DOCUMENTS

| | | |
|---|---|---|
| DE | 3443025 A1 | 6/1985 |
| DE | 4312032 A1 | 10/1993 |

(Continued)

*Primary Examiner* — Brian D Nash
(74) *Attorney, Agent, or Firm* — Dinsmore & Shohl LLP (57) ABSTRACT

A holder for fastening an accessory part to a two-wheeler comprises a base section for fastening the holder to the two-wheeler and a reception section for receiving a spigot-like holding section of the accessory part. In this respect, the reception section has a continuous passage which extends along a passage axis and which has an inlet section at a first end for introducing the holding section of the accessory part into the continuous passage as well as a constriction section at a second end opposite the first end whose cross-section is constricted with respect to the inlet section to limit the introduction of the holding section of the accessory part into the continuous passage.

21 Claims, 3 Drawing Sheets

(56) References Cited

U.S. PATENT DOCUMENTS

| | | | |
|---|---|---|---|
| 5,076,526 A * | 12/1991 | Zane | B62H 5/00 224/425 |
| 5,291,765 A * | 3/1994 | Hoisington | B62H 5/003 70/18 |
| 5,405,113 A * | 4/1995 | Jaw | B62J 11/00 224/425 |
| 5,474,270 A | 12/1995 | Rixen et al. | |
| D365,745 S * | 1/1996 | Brendel | D8/333 |
| 5,647,520 A * | 7/1997 | McDaid | B62J 11/00 224/425 |
| 5,669,536 A * | 9/1997 | Wang | B62H 5/00 224/443 |
| 5,704,526 A * | 1/1998 | Kuo | B62H 5/00 224/425 |
| 5,761,934 A * | 6/1998 | Kuo | E05B 17/002 70/233 |
| 5,810,228 A * | 9/1998 | Brokering | B62J 11/00 224/414 |
| 6,016,673 A * | 1/2000 | McDaid | B62H 5/003 224/451 |
| 6,321,961 B1 | 11/2001 | McDaid et al. | |
| 6,507,980 B2 | 1/2003 | Bremicker | |
| 6,619,084 B2 * | 9/2003 | Kuo | B62H 5/00 224/425 |
| 2008/0022734 A1 | 1/2008 | McDaid et al. | |

FOREIGN PATENT DOCUMENTS

| | | |
|---|---|---|
| DE | 9313594 U1 | 1/1995 |
| DE | 19824921 A1 | 12/1999 |
| DE | 29917292 U1 | 1/2000 |
| DE | 102004046533 A1 | 3/2006 |
| DE | 102009056111 A1 | 6/2011 |
| EP | 0566857 A1 | 10/1993 |
| EP | 0934869 A2 | 8/1999 |
| EP | 1182123 A2 | 2/2002 |
| JP | H10157679 A | 6/1998 |
| JP | H10250661 A | 9/1998 |
| JP | 2000309291 A | 11/2000 |
| JP | 2005324751 A | 11/2005 |
| TW | M378149 U | 4/2010 |
| WO | 9425330 A1 | 11/1994 |

* cited by examiner

Fig. 4

HOLDER

CROSS-REFERENCE TO RELATED APPLICATIONS

This application claims priority of German Patent Application 10 2015 109 997.7 filed on Jun. 22, 2015.

FIELD OF THE INVENTION

The invention relates to a holder for the fastening of an accessory part, in particular of a two-wheeler lock, to a two-wheeler.

BACKGROUND OF THE INVENTION

So that accessory parts for a two-wheeler such as tools or in particular two-wheeler locks are available during or after a trip with the two-wheeler, it is expedient to fasten them to the two-wheeler so that they are always taken along. A holder can be provided for this purpose which is in particular fastened, for example, to a frame of a respective two-wheeler and which is configured to hold a respective accessory part, in particular in a releasable manner.

The holding of the accessory part has in this respect to take place particularly reliably to prevent a falling off of the accessory part which could result in damage and/or injury, in particular during a trip. It is furthermore desirable that the holder allows an arrangement of the accessory part at the respective two-wheeler which is as flexible as possible to be able to fasten the respective accessory part at different points of a two-wheeler or at different two-wheelers in each case arranged so flexibly that the accessory part does not impede the use of the two-wheeler and takes up as little space as possible overall.

It is furthermore favorable with regard to a compact manner of construction of the respective accessory part if no additional section such as a rail, a web or a bolt, which is only provided for the support at the holder, is required at the accessory part for the arrangement of this accessory part at the holder, but rather that the accessory part is held by the holder, for example, at a holding section formed as an integral part of a base body of the accessory part.

This is in particular associated with difficulties when the accessory part is, for instance, a two-wheeler lock which is typically transported in a closed form, and then as a rule forming a closed loop, at the two-wheeler. For if the lock body of such a two-wheeler lock does not have any section projecting from the remaining lock body for a connection to the holder, it becomes necessary to "thread" the closed loop formed by the two-wheeler lock into the holder in some way such that the lock body of the two-wheeler lock can be fastened to the holder, with the lock body being formed generally independently of the function of an arrangement.

It is therefore in particular desirable if, for the connection to a holder, a respective accessory part does not have to have any elements which are recognizably only provided for an arrangement at a holder and which, for example, project from the remaining accessory part since such elements are perceived as "foreign bodies" with regard to the actual function of the accessory part and can therefore e.g. also impair the overall impression of the accessory part.

SUMMARY OF THE INVENTION

It is therefore an object of the invention to provide a holder for the fastening of an accessory part, in particular of a two-wheeler lock, to a two-wheeler which allows a flexible and reliable fastening of the respective accessory part and which is configured to cooperate with a holding section of a respective accessory part in a manner such that the holding section can be formed integrated into a base shape of the respective accessory part or embedded in another manner, in particular unobtrusively.

This object is satisfied by a holder for fastening an accessory part, in particular a two-wheeler lock, to a two-wheeler, comprising a base section for fastening the holder to the two-wheeler and a reception section for receiving a holding section, in particular a spigot-shaped holding section, of the accessory part, wherein the reception section has a continuous passage which extends along a passage axis and has an inlet section for introducing the holding section of the accessory part into the continuous passage at a first end as well as a constriction section at a second end opposite the first end, the cross-section of said constriction section being constricted with respect to the inlet section to limit the introduction of the holding section of the accessory part into the continuous passage. The constriction section, however, advantageously nevertheless forms an aperture for other sections, e.g. for a lock cable.

The base section can in this respect be formed directly for fastening to the two-wheeler, for example in that it has fastening means such as a strap, a clip, screw elements, hook-and-loop fastener elements or magnetic elements. The base section can, however, also alternatively or additionally be formed for the arrangement of a separate fastening part which can have a fastening device having e.g. the named fastening means. Such a fastening part can then also be specifically formed in the manner of an adapter for different fastening kinds, fastening options and/or for different properties of the respective section at the two-wheeler to which the holder is to be fastened and can in particular be replaceable as desired with other fastening parts.

The reception section of the holder serves for the holding cooperation with the respective accessory part, in particular with a holding section of the accessory part. In this respect, the reception section has a continuous passage, i.e. the passage is at least not completely closed at both ends of its longitudinal extent along the named passage axis. This makes it possible to hold a two-wheeler lock by means of a holder, for example, with the two-wheeler lock forming a closed loop since the loop can then extend through the passage, i.e. it enters into the continuous passage at the one side (at the inlet section at the first end) and can exit the passage again at the other side (at the constriction section at the second end).

In general, a continuous, preferably straight, extent of the continuous passage is defined by the named passage axis. The passage axis is, however, not limited to completely straight extents, but can rather also have an arcuate shape as long as the extent of the passage allows a threading through of a flexible cable of a respective accessory part or at least a threading in of a correspondingly curved rigid section of a respective accessory part.

The two ends of the continuous passage are not functionally equivalent with respect to its extent along the passage axis, but rather differ in that the first end is configured such that a holding section of a respective accessory part can be introduced into the continuous passage at this first end and starting from this first end. The first end in this respect has an inlet section which makes this possible. In contrast to this, the second end of the continuous passage has the function of limiting the introduction of the holding section of the respective accessory part to a specific introduction depth into the continuous passage, in particular to limit it so much that the holding section can be led up to the second end, but not through the second end out of the continuous passage. This function is achieved by the constriction section and in particular in that the cross-section of the continuous passage is constricted at this second end with respect to a cross-section at the inlet section, that is at the first end of the continuous passage.

The fact that the cross-section of the constriction section is constricted with respect to the inlet section means that at least one object, which completely fills the cross-section of the inlet section when it is introduced into the inlet section, cannot also be led through the constriction section on a displacement along the passage axis. In this respect, the constriction section in particular has a smaller cross-sectional surface than the inlet section, with the cross-sectional surface substantially being defined perpendicular to the passage axis. The cross-section of the constriction section can in particular be completely encompassed by the cross-section of the inlet section on an imaginary superposition with the cross-section of the inlet section, but not vice versa. In addition, the two cross-sections can generally have the same shape, but at a different scale, with the cross-section of the constriction section having smaller dimensions than the cross-section of the inlet section. The cross-section of the constriction section and the cross-section of the inlet section can in particular represent circular surfaces or circle-like surfaces concentric to the passage axis and having different diameters.

Since in accordance with the invention the holding section of a respective accessory part cannot be introduced into the continuous passage via the second end thereof, but rather only via the first end thereof and can additionally not penetrate further into the passage than up to the second end of the continuous passage, the first end and the second end in this respect represent an open end and a blocking end respectively, at least for the holding section of the accessory part. Nevertheless, the passage is formed as a continuous passage, that is it is open at both sides and is generally open, in particular for sections of a respective accessory part which have a smaller cross-section than the holding section of the accessory part.

The reception section of the holder can in particular be adapted to receive the holding section of a respective accessory part in a shape-matched manner. The reception section is preferably formed in a suitable manner for a reception of a spigot-shaped holding section since a spigot-shaped holding section provides a comparatively large interaction surface for a reliable arrangement at the reception section of the holder and at the same time allows a certain flexibility in the spatial orientation of the accessory part at the holder.

In accordance with an advantageous embodiment, the reception section has the shape of a conically tapering sleeve. In this respect, the conicity does not have to be constant, but can rather also be variable, i.e. the diameter (to be determined perpendicular to the passage axis) does not reduce linearly in the direction of the passage axis, but rather in a different manner, but in particular monotonously, from the inlet section toward the constriction section. The cross-sectional shape of such a conically tapering reception section can in this respect be formed, for instance, as circular, elliptic, oval or, for example in the manner of a polygon, in particular of a regular polygon, in particular having rounded corners.

It is furthermore preferred if the reception section has the shape of a circumferentially open sleeve. In other words, the continuous passage of the reception section has a lateral aperture, i.e. an aperture radial to the passage axis. This aperture in particular connects the first end of the continuous passage to the second end of the continuous passage to form a common opening.

The lateral aperture is in this respect formed to allow a lateral introduction of at least certain sections of a respective accessory part into the continuous passage, but not the holding section of the accessory part. For this purpose, the lateral aperture has a minimal spacing with respect to the peripheral direction which is smaller than a diameter of the passage, in particular smaller than a diameter of the inlet section.

Such a design of the reception section as a circumferentially open sleeve is in particular expedient when the holder is provided for fastening a two-wheeler lock which forms a loop in a closed form. A comparatively narrow or thin section of the closed loop can then be introduced into the continuous passage through the lateral aperture, whereby the two-wheeler lock is first only loosely arranged at the holder. The two-wheeler lock can subsequently be displaced along the passage axis until the holding section, which is thicker than the named thin section and can therefore not be led through the lateral aperture, has penetrated so far through the inlet section into the continuous passage, that is up to the limitation by the constriction section, that the two-wheeler lock is reliably held, in particular in a shape-matched manner, by the holder.

Comparable results are produced for other accessory parts which form a closed loop or are elongate, with the holding section being thicker, i.e. having a larger cross-sectional surface, with respect to the extent of the accessory part (at least in one direction) so that the accessory part can be placed laterally into the continuous passage with one of the thinner sections and the accessory part can extend further through both ends of the continuous passage when the holding section is inserted into the continuous passage of the reception section along the passage axis.

It is furthermore advantageous when the continuous passage is rotationally symmetrical with respect to the passage axis. A correspondingly formed holding section of an accessory part then namely does not first have to be aligned correctly with respect to a rotational position relative to the passage axis before it can be introduced into the continuous passage through the inlet section. An inner surface of the reception section and an outer surface of the holding section can then in particular contact one another with an exact fit independently of an angular alignment, i.e. rotational position, of the holding section with respect to the passage axis and/or can cooperate in another manner when the holding section is introduced into the continuous passage up to the limitation by the constriction section. This facilitates the operation and increases the flexibility of the arrangement of the accessory part at the holder.

In accordance with an advantageous embodiment, at least one guide element is formed at the reception section, in particular at an inner side of the reception section, said guide section extending into the passage to guide the introduction of the holding section at least regionally into the continuous passage in cooperation with a respective corresponding counter-element at the holding section of a respective accessory part. The guide can, for example, comprise the holding section of the respective accessory part being directed into a certain rotational position relative to the passage axis or being held in a rotational position it has first adopted on a further introduction.

It can generally also be necessary in this respect that the holding section is first moved, for instance by hand, into a matching angular orientation allowing a further introduction of the holding section into the continuous passage, but is then held in this angular orientation by the one or more guide elements on a further introduction into the continuous passage. The guide elements in this respect have the function of a security against rotation. In particular when the holding section of the respective accessory part is not elongate or is not substantially shorter than the continuous passage, the guide elements can furthermore serve to guide the holding section along a suitable extent through the continuous passage in order to prevent a canting, for instance.

A respective guide element can, for example, be formed as a guide projection or as a guide groove. This represents a constructionally particularly simple implementation of such a guide element. The holding section can have a substantially complementary guide groove as the counter-element cooperating with the guide element, in particular when the guide element is formed as a guide projection. Conversely, a counter-element of the holding section can be formed as a guide projection when a respective guide element is formed as a guide groove.

In accordance with a preferred further development, the guide element is configured to fix the holding section of a respective accessory part having a respective corresponding counter-element to one or more angular orientations with respect to the passage axis on the introduction of the holding section into the continuous passage up to the limitation by the constriction section. The guide element is in this respect therefore advantageously configured such that, in cooperation with a respective counter-element at the holding section of the respective accessory part, it allows an introduction movement of the holding section along the passage axis up to the limitation by the restriction section, but prevents any change to the angular orientation. This can be the case for the total extent of the introduction of the holding section from the inlet section up to the constriction section or only for a certain part region of the extent which in particular at least comprises the reaching of the limitation by the constriction section to fix the holding section with respect to its angular orientation at least in this completely introduced position.

The cooperation of the guide element with the respective counter-element can in this respect be such that a reaching of the limitation by the constriction section is only possible at all in one angular orientation or such that a plurality of different angular orientations, in particular regularly spaced apart angular orientations, can be adopted. In this respect, it can even be sufficient for the fixing of a plurality of possible angular orientations to provide a single guide element when, for instance, a plurality of counter-elements corresponding to, i.e. in particular complementary to, this one guide element are provided at the holding section of the respective accessory part and a respective one of said counter-elements cooperates with the one guide element in dependence on the angular orientation.

A fixing to a plurality of possible angular orientations can, however, also be achieved in that the reception section has a plurality of guide elements, whereby the stability of the guidance is additionally increased. The plurality of guide elements are then preferably arranged symmetrically such that the holding section of a respective accessory part having corresponding counter-elements can be introduced into the continuous passage up to the limitation by the constriction section in at least two different angular orientations with respect to the passage axis.

In this respect, there does not necessarily have to be just as many counter-elements formed at the holding section of the respective accessory part as there are guide elements at the reception section. If the guide elements of the reception section are, for example, guide grooves, it may be sufficient if only one single corresponding counter-element, namely a suitable guide projection, is formed at the holding section, said guide projection engaging into one of the guide grooves of the reception section in dependence on the angular orientation of the holding section. If, in contrast, the guide elements of the reception section are guide projections to cooperate with corresponding guide grooves at the holding section of the respective accessory part, an at least corresponding number of such guide grooves may be necessary as counter-elements at the holding section so that each guide projection engages into a respective guide groove and does not already block the holding section before reaching the limitation by the constriction section on the introduction of the holding section into the continuous passage.

If a plurality of guide elements are provided at the reception section, their symmetrical arrangement is advantageous to the extent that it allows a plurality of different angular arrangements of the holding section in the continuous passage in accordance with this symmetry without different guide elements having to be provided for the different angular orientations.

If the introduction of the holding section into the continuous passage up to the limitation by the constriction section is preset to a plurality of angular orientations, it is furthermore advantageous for the angular orientations to have angular differences with respect to one another of 45° or 60° or multiples of 45° or 60°, in particular 90°. Sensible gradations for a flexible arrangement of a respective accessory part at the holder are made possible by such angular differences without an excessively high number of guide elements having to be provided. For example, at least four angular orientations, preferably at least six, preferentially eight, in particular uniformly distributed angular orientations, can be predefined by the guide elements in which angular orientations the holding section of a respective accessory part can be located when it is introduced into the continuous passage up to the limitation by the constriction section, whereas other angular orientations can then not be adopted.

At least one of the provided guide elements can have as an additional function in addition to the function of guiding the holding section, for example in cooperation with a counter-element, and in particular of fixing it to one or more respective angular orientations, of cooperating as an abutment with the holding section of the respective accessory part to limit the introduction of the holding section into the continuous passage. For this purpose, the guide element can have an abutment section which is configured for this purpose.

This abutment effect limiting the introduction of the holding section into the continuous passage can be provided in addition to further cross-sectional constrictions in the region of the constriction section of the continuous passage. For example, an abutment surface can be configured at least in the region of the constriction section at an inner side of the reception section, in particular when it has the shape of a conically tapering sleeve, with the holding section impacting said abutment surface on reaching the limitation by the constriction section and said abutment surface preventing the holding section from exiting the continuous passage at its second end. It is, however, generally also possible that only the named abutment section formed at a guide element effects the constriction of the cross-section with respect to the inlet section and thus forms the only abutment which prevents the holding section from a further introduction into or exit from the continuous passage at its second end.

It is advantageous for a reliable holding of a respective accessory part means of the holder if, in addition to the reception of the holding section of the accessory part in the continuous passage of the reception section and the limitation of the introduction depth by means of the constriction section, the holding section is additionally prevented from again leaving the continuous passage in the reverse direction, that is through the inlet section at the first end of the passage—at least as long as this is not done deliberately, for instance when the accessory part is again to be released from the holder.

In accordance with a preferred embodiment, the holder therefore has a latch element which resiliently projects into the passage in a locking position, in particular perpendicular to the passage axis, to lock the holding section of the accessory part introduced into the passage. For this purpose, the latch element can, for example, engage into a latch recess, in particular into one of a plurality of latch recesses, at the holding section of the respective accessory part, whereby the holding section is blocked in the continuous passage against a displacement along the passage axis at least in the direction toward the inlet section at the first end of the passage. This blocking takes place, in particular automatically, due to the resilience, at least when, preferably only when, the holding section is introduced completely, i.e. up to the limitation by the constriction section, into the continuous passage and is therefore simultaneously blocked against a further displacement in the direction toward the constriction section at the second end of the passage. A respective accessory part can thus be held in a fixed position at least with respect to a movement along the passage axis.

When a corresponding latch recess is formed at the holding section of the accessory part, for instance as a latch groove running around in the peripheral direction, the holding section can admittedly in this respect be in a fixed position with respect to a movement along the passage axis, but still e.g. be rotationally movable about the passage axis. The latch element and/or the holding section can, however, also be configured such that the cooperation of the latch element and of the holding section also restricts or blocks the rotational movability of the holding section in the reception section of the holder. This can be provided alternatively or additionally to the described fixing of the holding section to respective angular orientations by the named guide elements. The latch element can in particular also be formed as a guide element in the above-described sense or, conversely, a guide element can be formed simultaneously as a latch element and can thus have a dual function.

Since the latch element is formed as springing back into the locking position in which it projects into the passage, the latch element can be configured such that it is urged back into the continuous passage by the holding section on the introduction of the holding section into the continuous passage so that the latch element does not impede the introduction of the holding section. The holding section is in this respect preferably configured such that the latch element can spring back into its locking position on reaching the maximum introduction depth of the holding section in order e.g. to engage behind a latch recess of the holding section and thus to block the holding section against a moving out from the continuous passage in the direction opposite to the introduction. So that the latch element can be urged out of its locking position by the holding section without being damaged, the latch element can have a flank which is suitable for a corresponding cooperation with the holding section and which is in particular aligned obliquely to the passage axis.

To prevent an unintentional release of the accessory part from the holder, it is furthermore advantageous for the latch element to be displaceable out of its locking position into a release position essentially only due to a manual actuation. It is preferred in this respect for the holder to have at least one actuation section accessible at an outer side of the holder, with the latch element being able to be displaced out of the passage into a release position by actuation of the actuation section to release the holding section of the accessory part for a removal from the passage. The actuation can in this respect in particular comprise a pressing or pulling of the respective actuation section.

In accordance with a preferred further development, the holder comprises a base body at which the base section and the reception section are formed, a latching part and a fastening part, wherein the fastening part has a fastening device (e.g. with fastening means such as those named further above) for fastening the holder to the two-wheeler, wherein the latching part is arranged between a lower side of the base section and an upper side of the fastening part and the latch element has the at least one actuation section as well as a web section to which the latch element is molded, and wherein the at least one actuation section is formed at an end of the web section.

The latch element in this embodiment is therefore separate from the base section and the reception section, namely as a part of a separate latching part. Since the named actuation section is also formed at the latching part, the latching part is also formed independently of the base body of the holder with respect to its function of locking the holding section of a respective accessory part introduced into the continuous passage or of releasing it for a removal from the passage on an actuation of the actuation section.

A respective actuation section is preferably provided at two opposite ends of the web section. In this respect, the actuation of a single actuation section can be sufficient for displacing the latch element into its release position. However, both actuation sections are preferably to be actuated simultaneously, in particular in opposite directions, preferably toward one another, to displace the latch element into its release position. The holder is thereby secured against an unintentional release of a respective accessory part by an accidental actuation of a single actuation section, but can nevertheless be actuated simply.

In accordance with an advantageous further development, the latching part is configured such that an actuation of the actuation section results in a bending of the web section as a result of which the latch element is displaced into the release position. For this purpose, the latch element can be molded to the web section in a central region thereof and can extend, in particular perpendicular to a longitudinal extent of the web section, away from the web section and (in the locking position) into the passage. On a bending of the web section as a result of an actuation of the actuation section, the named central region of the web section with the latch element is then advantageously deflected substantially perpendicular to the longitudinal extent of the web section, whereby the latch element is displaced into the release position. Respective actuation sections formed at opposite ends of the web section can in this respect in particular be configured to exert a bending torque on the web section on an actuation, for instance on a pressure actuation. The actuation can, however, also result in a force effect in the direction of the longitudinal extent of the web section which effects a lateral escape of the web section, that is the bending to be achieved, on an exceeding of the kink load of the web section.

In accordance with a preferred further development, the latching part is captured solely by a fixing of the fastening part to the lower side of the base section of the base body between the lower side of the base section and the upper side of the fastening part in a vertical direction. The vertical direction is in this respect defined in that the lower side of the base section is arranged above the upper side of the fastening part. The vertical direction is therefore in particular aligned perpendicular to the lower side of the base section or to the upper side of the fastening part.

Due to the named arrangement, the latching part can first simply be placed loosely at the base body, namely at the lower side of the base section, on an assembly of the holder without any holding means being required for this purpose since the latching part is subsequently securely held at the holder since the fastening part is fixed to the base body and in this respect holds the latching part between it and the base body. A particularly simple design of the holder with few parts and additionally a simple assembly hereby results.

To fix the fastening part to the base body, screw connections or other pin-like fixing means can be provided which can also extend through the latching part. The latching part can for this purpose have one or more corresponding passage openings, in particular in its web section, which are configured such that a displacement of the latch element by a fixing means extending through a respective passage opening is not impeded. The latching part and in particular its web section can be formed comparatively large for a particularly high stability and long service life due to such a design, but the holder can nevertheless have a compact constructional shape.

The invention also relates, generally independently of the above-described embodiments, to a holder for fastening an accessory part, in particular a two-wheeler lock, to a two-wheeler, said holder comprising a base body, a latching part and a fastening part, wherein the base body has a base section for connection to the fastening part and a reception section for receiving a holding section of the accessory part in a reception region, wherein the fastening part has a fastening device (such as a clip) for fastening the holder to the two-wheeler, wherein the latching part is arranged between a lower side of the base section and an upper side of the fastening part and has a web section, a latch element molded to the web section and at least one actuation section formed at an end of the web section and accessible at an outer side of the holder, wherein the latch element projects resiliently into the reception region of the reception section of the base body in a locking position to lock the holding section of the accessory part introduced into the reception region, and wherein the latch element can be displaced out of the reception region into a release position by an actuation of the actuation element to release the holding section of the accessory part for a removal from the reception region, wherein in particular the latching part is solely captured between the lower side of the base section and the upper side of the fastening part in a vertical direction by a fixing of the fastening part at the lower side of the base section of the base body.

Such a holder furthermore preferably has individual features or a plurality of the features described with respect to the above embodiments. The named reception region of the reception section is, for example, preferably a continuous passage such as described above.

The object is furthermore satisfied by an arrangement comprising an accessory part, in particular a two-wheeler lock, having a holding section, in particular of spigot shape and preferably formed integrally at the accessory part, and a holder in accordance with the above description, wherein the reception section of the holder and the holding section of the accessory part are formed in at least a substantially complementary manner with one another. The reception region of the holder and the holding section of the accessory part are therefore coordinated with one another with respect to a reliable cooperation. A reception of the holding section of the accessory part in the reception section of the holder with an exact fit is in particular achieved by the complementary formation, with the reception section of the holder and the holding section of the accessory part preferably coming to lie at one another in a largely areal manner when the holding section is completely introduced into the reception section. An integral configuration of the holding section at the accessory part additionally has the advantage (as also explained above) that the holding section is unobtrusive when the accessory part is not arranged at the holder, for instance on a use of the accessory part, so that it is not recognizable as a holding section formed for a cooperation with a holder and the use of the accessory can be formed in a non-disturbing manner.

BRIEF DESCRIPTION OF THE DRAWINGS

The invention will be described in more detail in the following only by way of example with reference to the drawings.

DETAILED DESCRIPTION OF THE PREFERRED EMBODIMENTS

Figure 1:
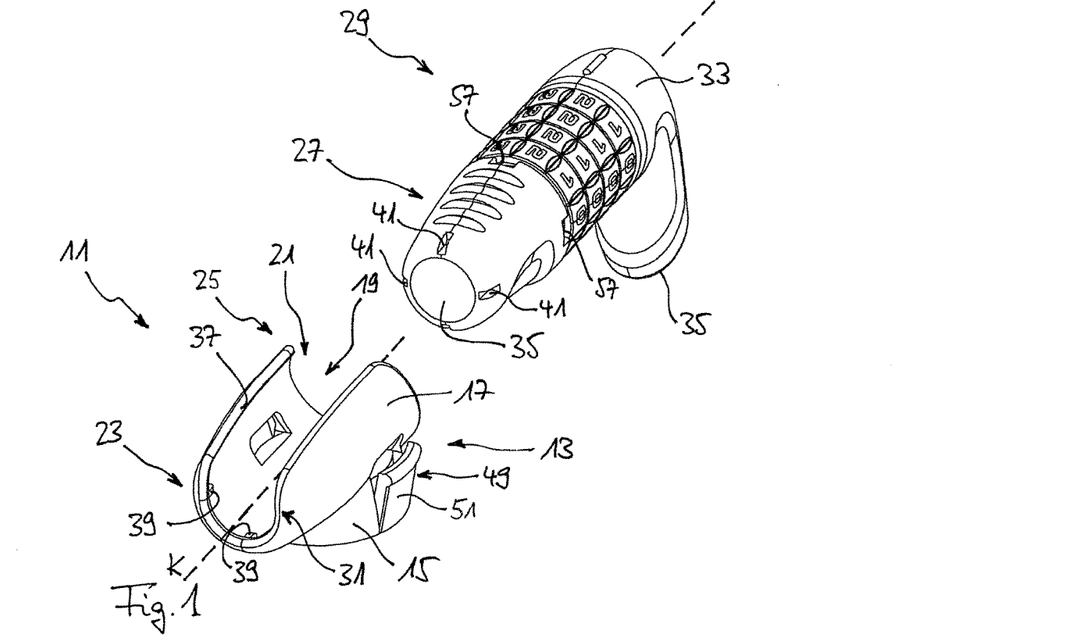
FIG. 1 shows in a perspective representation a first embodiment of a holder for a two-wheeler lock together with the lock body of the two-wheeler lock.
Figure 2:
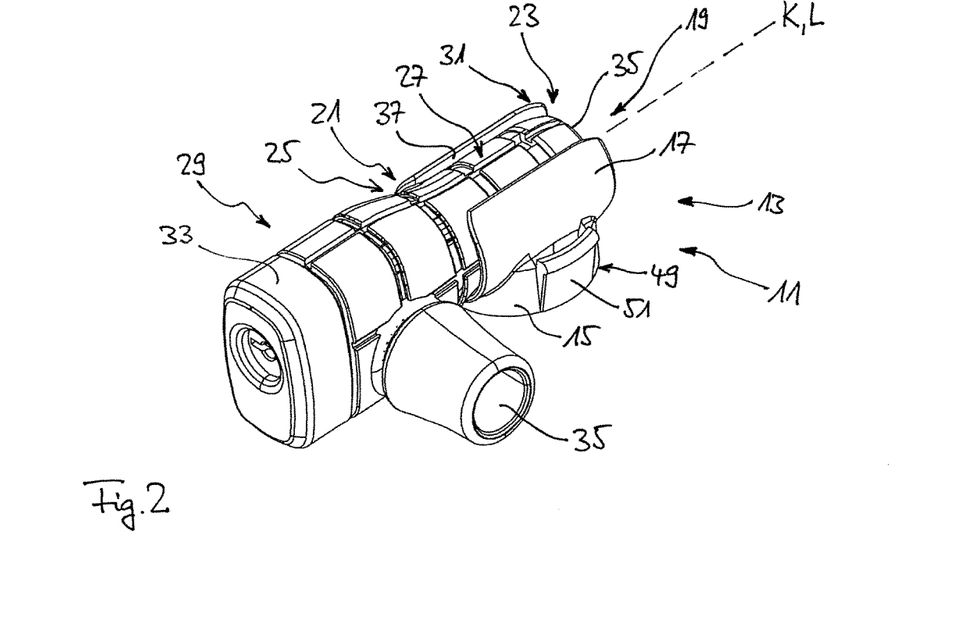
FIG. 2 shows in a perspective representation a second embodiment of a holder for a two-wheeler lock with a lock body of the two-wheeler lock held by the holder.

FIGS. 1 and 2 show respective embodiments of holders 11 in accordance with the invention, wherein mutually corresponding elements are marked by the same respective reference numerals. The holders 11 each comprise a base body 13 having a base section 15 formed thereat for fastening the holder 11 to a two-wheeler. For this purpose, the lower side of the base section 15 (cf. FIG. 4) is configured such that a fastening part (not shown) can be fixed thereto which has a fastening device and via which the holder 11 can be fastened to the two-wheeler.

Opposite the lower side of the base section 15, the holder 11 has a reception section 17 formed at the base body 13 in the form of a substantially conically tapering, circumferentially open sleeve whose inner region defines a continuous passage 19. The continuous passage 19 extends through the sleeve along a passage axis K with respect to which the passage 19 is formed substantially rotationally symmetrically with a round cross-section and is open at both ends 21, 23 of its extent.

The named conical tapering of the reception section 17 is not constant, but rather has a swept extent, with the diameter of the continuous passage 19 (to be determined perpendicular to the passage axis K) reducing monotonously from a first end 21 to a second end 23 of the passage 19. An inlet section 25 is thereby formed at the first end 21 through which or past which a spigot-shaped holding section 27 of an accessory part 29 to be held by means of the holder 11 can be introduced into the continuous passage 19.

A constriction section 31 is, in contrast, formed at the opposite second end 23 and its cross-section is constricted with respect to the inlet section 25 due to the named tapering. The cross-section of the constriction section 31, as also the cross-section of the inlet section 25, is in particular circular, however with a smaller diameter. This has the consequence that the holding section 27 of the respective accessory part 29 cannot exit the passage 19 again through the constriction section 31 or past the constriction section 31 at the second end 23 of the continuous passage 19.

The accessory parts 29 shown in FIGS. 1 and 2 are two-wheeler locks of which only the respective lock body 33 is shown at which the respective holding section 27 is formed as an integral component. The holding section 27 in this respect in particular does not project from the remaining accessory part 29, but is rather embedded in the total shape (namely in the lock body 33). The two-wheeler lock 29 shown in FIG. 1 is a two-wheeler lock 29 having a combination lock; in contrast, the one shown in FIG. 2 is a two-wheeler lock 29 having a lock cylinder to be actuated by means of a key.

Cable mounts 35 are formed at the lock body 33 of the respective two-wheeler lock 29 at which the ends of a respective cable (not shown) (or also of a link chain or of a sprocket chain or of a hoop) of the respective two-wheeler lock 29 open. In this respect, the lock body 33 is respectively shown in its closed position in which such two-wheeler locks 29 are typically to be held at a two-wheeler. The respective cable in this position forms a closed loop together with the lock body 33. Since the holding section 27 is formed integrally at the lock body 33 and is substantially formed by a part of the lock body 33 in the shown embodiments, the holding section 27 forms a component of the named closed loop.

So that a holding section 27 of a respective accessory part 29 integrated into the remaining accessory part in this manner can also be introduced into the continuous passage 19 of the reception section 17 of the holder 11 when the accessory part forms a closed loop, the reception section 17 has a lateral aperture 37 which extends in parallel with the passage axis K, which connects the first end 21 to the second end 23 of the reception section 17 and through which at least sufficiently narrow sections of the loop (e.g. the named cable of one of the two-wheeler locks 29 or of another two-wheeler lock) can be laterally introduced into the continuous passage 19. The holding section 27 can in contrast not be introduced into the continuous passage 19 through the lateral aperture 37, but rather only via the inlet section 25 since the aperture 37 is designed such that it is narrower than the inlet section 35, that is has a minimal passage spacing in the peripheral direction which is smaller than a passage diameter of the inlet section 25.

As is shown in FIG. 2, the holding section 27 can be introduced so far into the continuous passage 19 in the direction of the passage axis K until it abuts the constriction section 31 due to the cross-sectional constriction and is thus limited to the shown holding position in which the holding section 27 of the accessory part 29 is then held by the reception section 17 of the holder 11. An inner surface of the reception section 17 is in this respect preferably formed at least substantially in a matching complementary manner to an outer surface of the holding section 27 so that they can contact one another and can cooperate areally in the shown holding position to reliably hold the holding section 27.

Figure 3A:
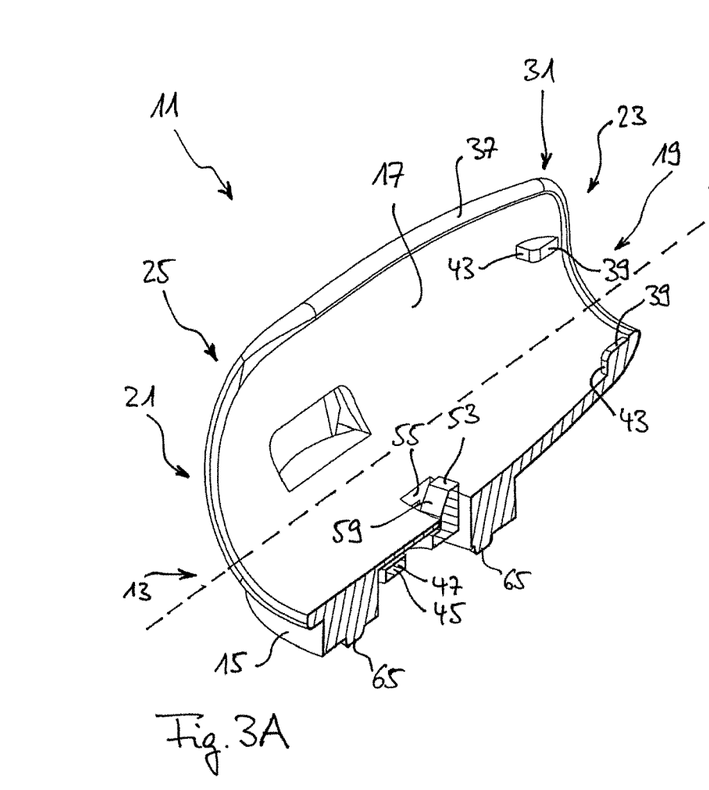
FIGS. 3A and 3B show the first embodiment in perspective sectional representations with different sectional planes.
Figure 3B:
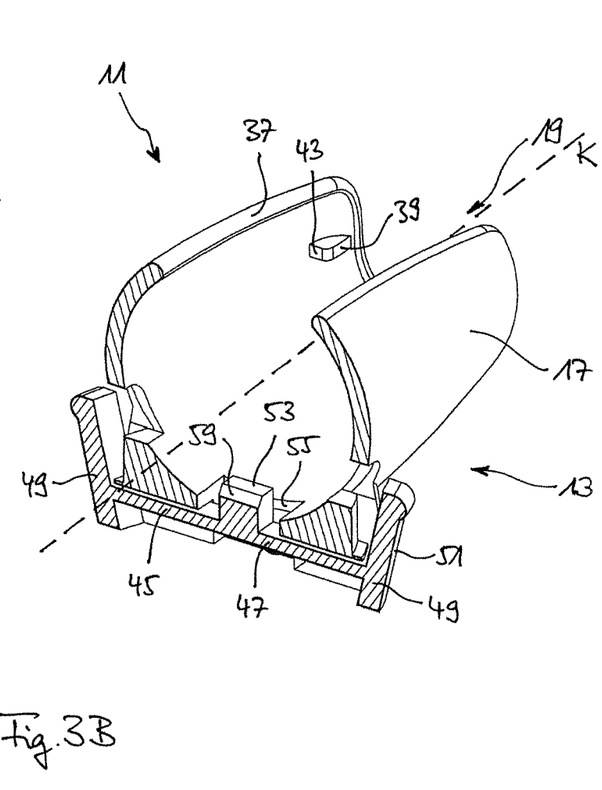

As can be recognized in FIG. 1 and in particular also in the sectional representations of this embodiment in FIGS. 3A and 3B, guide elements 39 are formed at an inner side of the reception section 17 in the form of guide projections which extend into the continuous passage 19. The guide elements 39 are configured to cooperate with corresponding counter-elements 41 at the holding section 27 of a respective accessory part 29. These counter-elements 41 are formed in the accessory part 29 shown in FIG. 1 by short guide grooves which are substantially complementary to the guide projections 39 of the reception section 17, that is are completely filled by the guide projections 39 when the holding section 27 is completely introduced into the passage 19, i.e. up to the limitation by the constriction section 31. In contrast, the counter-elements 41 of the accessory part 29 shown in FIG. 2 which are likewise formed as guide grooves are longer and extend beyond the holding section 27 over the total lock body 33.

The guide elements 39 serve to fix the holding section 27 in the continuous passage 19 to a certain restricted number of angular orientations relative to the passage axis K. The guide elements 39 are generally preferably provided, as shown, in the region of the constriction section 31 such that the holding section 27 is not initially restricted with respect to its angular orientation on the introduction into the passage 19 by the guide elements 39. If the holding section 27, however, has reached its holding position introduced up to the constriction section 31 in one of the angular orientations permitted by the guide elements 39, it is blocked against a rotational movement about the passage axis K out of this angular orientation by the guide elements 39. The guide elements 39 in this respect represent a security against rotation for the holding section 27.

In addition, abutment sections 43 are formed at the guide elements 39; they are aligned perpendicular to the passage axis K and cooperate with corresponding surfaces at the counter-elements 41 at least in the embodiment as an abutment shown in FIG. 1. In this respect, the counter-elements 41 impact the abutment sections 43 just when the holding section 27 has just been introduced into the continuous passage 19 up to the limitation by the constriction section 31. The guide elements 39 thus contribute to the constriction of the cross-section of the constriction section and support the limitation of the movability of the holding section 27 along the passage axis K in the passage 19 by the constriction section 31.

In the embodiments shown, a respective three guide elements 39 are provided at the reception section 17 which are arranged at angular intervals of 90° with respect to the passage axis K. Four counter-elements 41 are provided at the holding sections 27 of the respective accessory parts 29; they are configured for a cooperation with the guide elements 39 and are likewise arranged at angular intervals of 90° from one another with respect to a longitudinal axis L of the holding section 27 which coincides with the passage axis K with a holding section 27 introduced into the passage 19. The respective holding section 27 is thereby fixed to four possible angular orientations in which it can be aligned relative to the passage axis K when it is introduced into the continuous passage 19 up to the limitation by the constriction section 31.

A single guide element 39 at the reception section 17, which cooperates with a respective other one of the counter-elements 41 depending on the angular orientation, would generally be sufficient for the fixing (in this case). Since, however, a plurality of guide elements 39 cooperate with a respective counter-element 41, a more stable fixing of the angular orientation is achieved. The different possible angular orientations are in this respect advantageously distributed, as in the embodiments shown, evenly over the total angular range so that the alignment of the arrangement of the respective accessory part 29 at the two-wheeler can be set in as flexible a manner as possible.

It can be recognized in the sectional representations of FIGS. 3A and 3B, which show the same embodiment as FIG. 1, that the holder 11 comprises a latching part 45 which is arranged at a lower side of the base section 15. The latching part 45 has an areally formed elongate web section 27 which substantially extends over the total width of the holder 11 or over a diameter of the base section 15 and is aligned transversely to the extent of the continuous passage 19 in the state arranged at the base section 15.

A respective areal actuation section 49 is formed at both ends of the longitudinal extent of the web section 47; it is aligned approximately perpendicular to the longitudinal extent of the web section 47 and its flat side facing away from the web section 47 forms an actuation surface 51. The ends of the web section 47 in this respect impact the respective actuation section 49 in a decentral manner such that, with a central force effect on the actuation surface 51 of a respective actuation section 49 in the direction of the longitudinal extent of the web section 47, a bending torque is exerted onto the web section 47 as a result of which the web section is bent.

The latching part 45 furthermore comprises a latch element 53 which is molded centrally at the web section 47 with respect to the longitudinal extent thereof. The latch element 53 in this respect extends perpendicular away from a flat side of the web section 47 and, when the web section 47 is free of force effects emanating from the actuation sections 49 and is thus unbent, projects through an opening 55, which pierces through the base section 15 and the reception section 17, up to and into the continuous passage 19. This position shown in FIGS. 3A and 3B represents a locking position of the latch element 53 since the latch element 53 can, since it projects into the continuous passage 19, engage into one of, preferably, a plurality of latch recesses 57 formed at the holding section 27 of the respective accessory part 29 to lock the holding section 27 completely introduced into the passage 19, i.e. to block it against a displacement in the direction of the passage axis K in this completely introduced position. In this respect, the plurality of latch recesses 57 are advantageously arranged at the same angular intervals from one another with respect to the longitudinal axis L which the guide elements 39 also have with respect to one another so that an engagement of the latch element 53 into a respective latch recess 57 is possible independently of which of the angular orientations predefined by the guide element 39 the holding section 27 adopts.

If the web section 47 is bent by pressing onto the two actuation surfaces 51 of the actuation sections 49 of the latching part 45, the latch element 53 is thereby moved out of the continuous passage 19 and is thus optionally brought out of engagement with a respective latch recess 57 of a holding section 27 of a respective accessory part 29. This then corresponds to a release position of the latch element 53 in which a holding section 27 completely introduced into the continuous passage 19 can again be moved oppositely, that is in the direction of the inlet section 25 of the reception section 17 to release the holding section 27 from the holder 11.

So that the latch element 53 only blocks a release, but not also the introduction of the holding section 27 when it is located in its locking position, the latch element 53 has a flank 59 which is aligned obliquely to the passage axis K such that a holding section 72, which is introduced into the continuous passage 19, impacts the flank 59 and the force thereby exerted onto the flank 59 results in a displacement of the latch element 53 out of the continuous passage 19. Since the web section 47 is hereby bent without actuating the actuation sections 49, the displacement of the latch element 53 takes place against the preload present due to the bending of the web section 47 which urges the latch element 53 back into its locking position as soon as a suitable latch recess 57 at the holding section 27 is aligned with the opening 55, which is advantageously the case just when the holding section 27 is introduced into the continuous passage 19 up to the limitation by the constriction section 31 such that the holding section 27 is then held reliably in this position.

Different elements thus cooperate for a particularly reliable fastening of the respective accessory part 29 to the holder 11: The spatial alignment of the holding section 27 of the respective accessory part 29 coaxially to the passage axis K is first fixed by the sleeve shape of the reception section 17 of the holder 11 such that a movement of the holding section 27 can only take place along the passage axis K or about the passage axis K. The movement along the passage axis K is limited to a maximum introduction depth by the constriction section 31 in the direction of the second end 23 of the continuous passage 19 such that the holding section 27 cannot exit the passage 19 at the second end 23. In the opposite direction, a movement along the passage axis K is bounded by the latch element 53 (at least after reaching this maximum introduction depth) such that the holding section 27 is then held axially immovably in the passage 19 of the reception section 17. The guide means 39 finally have only permitted the introduction of the holding section 27 up to and into the maximum introduction depth in a respective one of a certain number of fixed angular orientations and now block the holding section 27 against a rotational movement about the passage axis K such that the holding section 27 is held in a fixed position and rotationally fixed overall relative to the reception section 17 at the holder 11.

Figure 4:
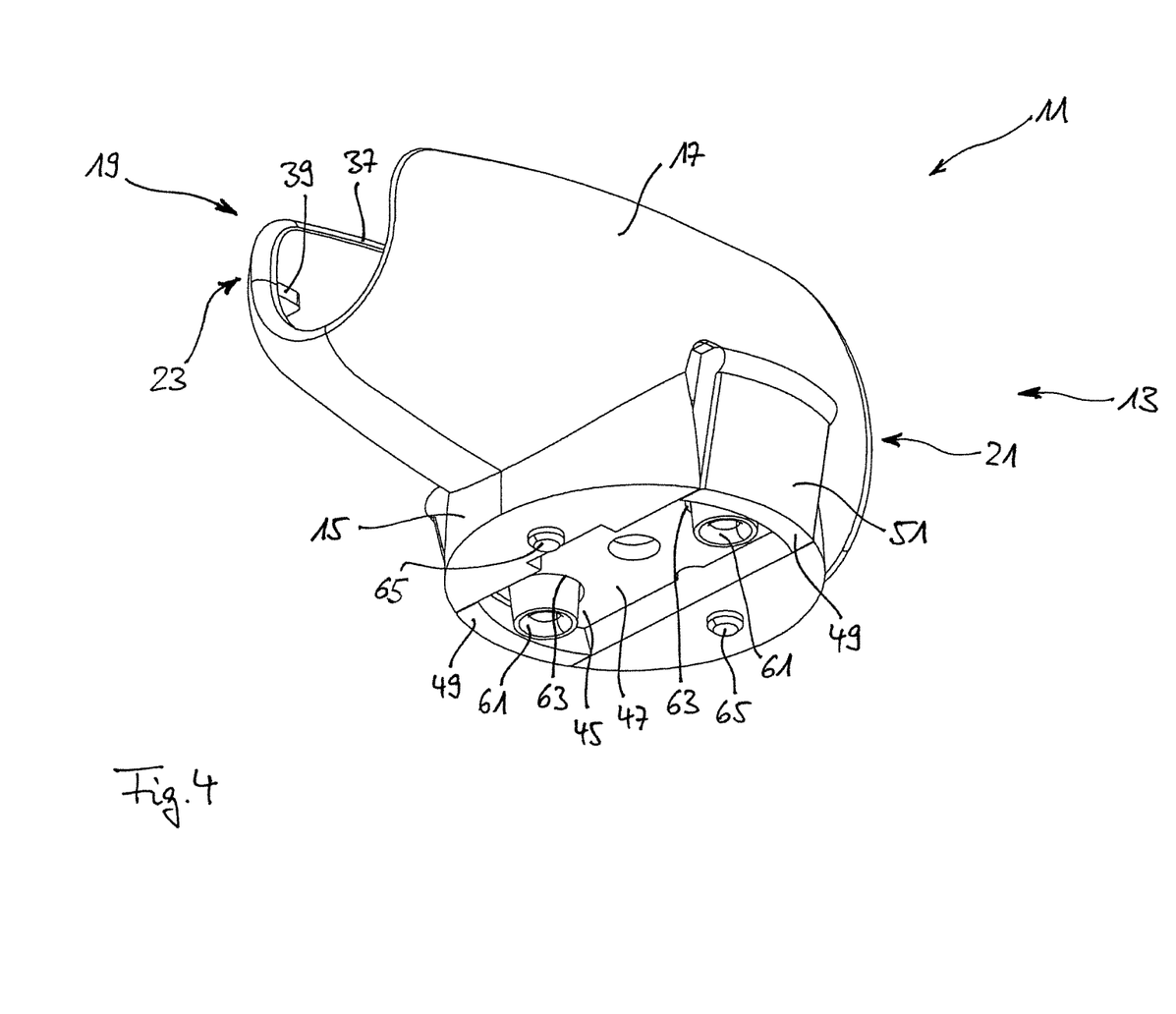
FIG. 4 shows in a perspective representation the first embodiment from a direction of view obliquely from below.

The embodiment of a holder 11 also shown in FIG. 1 and in FIGS. 3A and 3B is shown in FIG. 4 from a direction of view from which the lower side of the base section 15 can be seen. It can be recognized that the latching part 45 is arranged substantially loosely at the lower side of the base section 15. To fix a fastening part (not shown) at the base section 15, the base section 15 has screw mounts 62 at its lower side which extend through passage openings 63 in the form of round holes in the web section 47 of the latching part 45. A fastening part having fixing means such as screws can be fixed to these screw mounts 61 such that the latching part 45 is then captured solely by the fixing of the fastening part to the base section 15 between the lower side of the base section 15 and the upper side of the fastening part in a vertical direction, that is perpendicular to the lower side of the base section 15. Spigots 65 securing against rotation are furthermore provided at the lower side of the base section 15 and further stabilize the fixing of the fastening section to the base section 15 in cooperation with corresponding mounts securing against rotation at the fastening section.

A simple assembly and a compact construction of the holder 11 with a particularly simple operability of the latch mechanism are achieved by such a configuration with a generally loose support of the latching part 45 at the base section 15, but with a reliable securing of the latching part 45 by the fixing of the fastening part at the base section 15.

The invention claimed is:

1. A holder for fastening an accessory part, in particular a two-wheeler lock, to a two-wheeler, the accessory part including a holding section, the holder comprising:
    a base section configured to fasten the holder to the two-wheeler and a reception section configured to receive the holding section of the accessory part,
    wherein the reception section has an inner wall that at least partially defines a continuous passage which extends along a passage axis and which has an inlet section at a first end configured to introduce the holding section of the accessory part into the continuous passage, the continuous passage has a constriction section at a second end opposite the first end, a cross-section of the constriction section being constricted with respect to the inlet section to limit an introduction of the holding section of the accessory part into the continuous passage,
    wherein at least one guide element is formed on the inner wall of the reception section, the at least one guide element extends outwardly from the inner wall so as to extend into the continuous passage to guide the introduction of the holding section at least regionally into the continuous passage in cooperation with a respective corresponding counter-element at the holding section of the accessory part.

2. The holder in accordance with claim 1, wherein the reception section has a shape of a conically tapering and/or circumferentially open sleeve.

3. The holder in accordance with claim 1, wherein the continuous passage is rotationally symmetrical with respect to the passage axis.

4. The holder in accordance with claim 1, wherein the at least one guide element is configured as a guide projection or as a guide groove.

5. The holder in accordance with claim 1, wherein the at least one guide element is configured to fix the holding section of the accessory part having the respective corresponding counter-element on the introduction of the holding section into the continuous passage up to a limitation by the constriction section to one or more angular orientations with respect to the passage axis.

6. The holder in accordance with claim 5, wherein the introduction of the holding section into the continuous passage up to the limitation by the constriction section is fixed to a plurality of angular orientations which have angular differences with respect to one another of at least one of: 45°, or 60°, or multiples of 45°, or multiples of 60°, or 90°.

7. The holder in accordance with claim 1, wherein the reception section has a plurality of guide elements which are arranged symmetrically such that the holding section of the accessory part having corresponding counter-elements can be introduced into the continuous passage in at least two different angular orientations with respect to the passage axis up to a limitation by the constriction section.

8. The holder in accordance with claim 1, wherein the at least one guide element has an abutment section which is configured to cooperate as an abutment with the holding section of the accessory part to limit the introduction of the holding section into the continuous passage.

9. The holder in accordance with claim 1, wherein the at least one guide element is formed at an inner side of the reception section.

10. The holder in accordance with claim 1, wherein the holder has a latch element which projects resiliently into the continuous passage in a locking position to lock the holding section of the accessory part introduced into the continuous passage.

11. The holder in accordance with claim 10, wherein the holder has at least one actuation section accessible at an outer side of the holder, wherein the latch element can be displaced out of the continuous passage into a release position by actuating the at least one actuation section to release the holding section of the accessory part for a removal from the continuous passage.

12. The holder in accordance with claim 11, wherein the holder comprises a base body at which the base section and the reception section are formed, a latching part and a fastening part;
    wherein the fastening part has a fastening device configured to fasten the holder to the two-wheeler;
    wherein the latching part is arranged between a lower side of the base section and an upper side of the fastening part and the latch element has the at least one actuation section as well as a web section at which the latch element is molded; and
    wherein the at least one actuation section is formed at an end of the web section.

13. The holder in accordance with claim 12, wherein the latching part is configured such that an actuation of the at least one actuation section results in a bending of the web section as a result of which the latch element is displaced into the release position.

14. The holder in accordance with claim 12, wherein the latching part is solely captured by a fixing of the fastening part at the lower side of the base section of the base body between the lower side of the base section and the upper side of the fastening part in a vertical direction.

15. The holder in accordance with claim 10, wherein the latch element of the holder projects perpendicular to the passage axis into the continuous passage in the locking position.

16. The holder in accordance with claim 1, wherein the holding section of the accessory part is spigot-shaped.

17. An arrangement for a two-wheeler, the arrangement comprising:
    an accessory part, in particular a two-wheeler lock, the accessory part includes a holding section; and
    a holder that includes a base section and a reception section, the base section configured to fasten the accessory part to the two-wheeler, the reception section of the holder and the holding section of the accessory part are formed in at least a substantially complementary manner to one another such that the reception section is configured to receive the holding section of the accessory part,
    wherein the reception section has an inner wall that at least partially defines a continuous passage which extends along a passage axis and which has an inlet section at a first end configured to introduce the holding section of the accessory part into the continuous passage, the continuous passage has a constriction section at a second end opposite the first end, a cross-section of the constriction section being constricted with respect to the inlet section to limit an introduction of the holding section of the accessory part into the continuous passage, wherein at least one guide element is formed on the inner wall of the reception section, the at least one guide element extends outwardly from the inner wall so as to extend into the continuous passage to guide the introduction of the holding section at least regionally into the continuous passage in cooperation with a respective corresponding counter-element at the holding section of the accessory part.

18. The arrangement in accordance with claim 17, wherein the holding section of the accessory part is of spigot shape and/or formed integrally at the accessory part.

19. The arrangement in accordance with claim 17, wherein the at least one guide element has an abutment section which is configured to cooperate as an abutment with the holding section of the accessory part to limit the introduction of the holding section into the continuous passage.

20. A holder for fastening an accessory part to a two-wheeler, the accessory part including a holding section, the holder comprising:
- a base section configured to fasten the holder to the two-wheeler and a reception section configured to receive the holding section of the accessory part,
- wherein the reception section has a continuous passage which extends along a passage axis and which has an inlet section at a first end configured to introduce the holding section of the accessory part into the continuous passage, the continuous passage has a constriction section at a second end opposite the first end, a cross-section of the constriction section being constricted with respect to the inlet section to limit an introduction of the holding section of the accessory part into the continuous passage,
- wherein the holder has a latch element which projects resiliently into the continuous passage in a locking position to lock the holding section of the accessory part introduced into the continuous passage;
- wherein the holder has at least one actuation section accessible at an outer side of the holder, the latch element can be displaced out of the continuous passage into a release position by actuating the at least one actuation section to release the holding section of the accessory part for a removal from the continuous passage;
- wherein the holder comprises a base body at which the base section and the reception section are formed, a latching part and a fastening part;
- wherein the fastening part has a fastening device configured to fasten the holder to the two-wheeler;
- wherein the latching part is arranged between a lower side of the base section and an upper side of the fastening part and the latch element has the at least one actuation section as well as a web section at which the latch element is molded; and
- wherein the at least one actuation section is formed at an end of the web section.

21. A holder for fastening an accessory part, in particular a two-wheeler lock, to a two-wheeler, the accessory part including a holding section, the holder comprising:
- a base section configured to fasten the holder to the two-wheeler and a reception section configured to receive the holding section of the accessory part,
- wherein the reception section has a continuous passage which extends along a passage axis and which has an inlet section at a first end configured to introduce the holding section of the accessory part into the continuous passage, the continuous passage has a constriction section at a second end opposite the first end, a cross-section of the constriction section being constricted with respect to the inlet section to limit an introduction of the holding section of the accessory part into the continuous passage,
- wherein at least one guide element is formed at the reception section, the at least one guide element extends into the continuous passage to guide the introduction of the holding section at least regionally into the continuous passage in cooperation with a respective corresponding counter-element at the holding section of the accessory part, the at least one guide element, the at least one guide element is fixed in position.

* * * * *